UNITED STATES PATENT OFFICE.

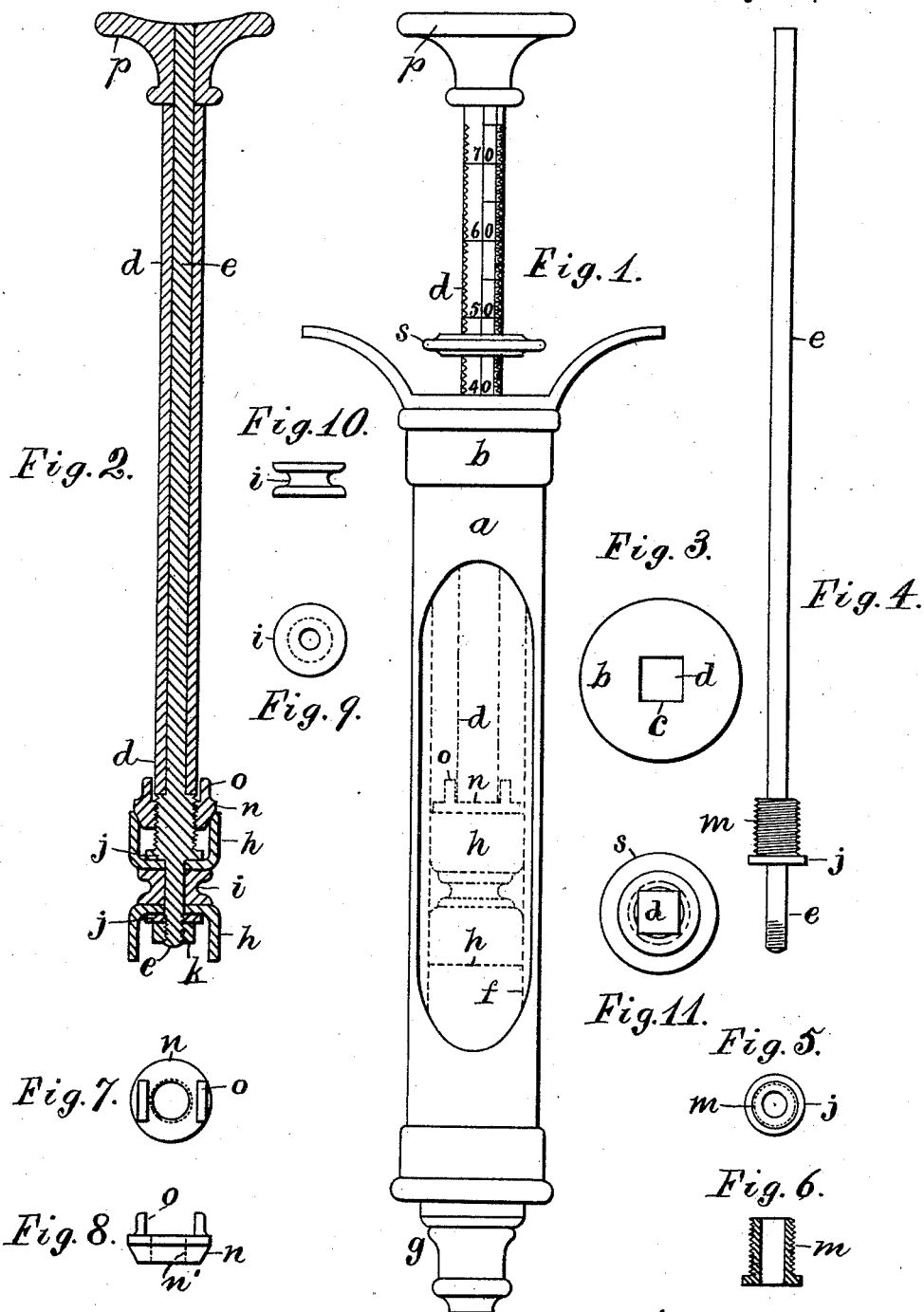

THEODORE B. WILCOX, OF NEWARK, NEW JERSEY.

SYRINGE.

SPECIFICATION forming part of Letters Patent No. 475,909, dated May 31, 1892.

Application filed September 4, 1891. Serial No. 404,685. (No model.)

*To all whom it may concern:*

Be it known that I, THEODORE B. WILCOX, a citizen of the United States, residing at Newark, Essex county, New Jersey, have invented certain new and useful Improvements in Syringes, fully described and represented in the following specification and the accompanying drawings, forming a part of the same.

In hypodermic syringes the plunger is provided with a graduated stem by which the movement of the piston is adjusted; and the object of the present invention is to furnish a means of operating through the stem to expand the piston-packing without rotating the stem or being required to hold the same from turning. These objects are effected, first, by making the stem square and fitting it to a square aperture in the cap of the syringe, and the expansion of the piston-packing is effected by a rod swiveled within the stem and provided near the packing with a threaded conical collar, which is held from turning by engagement with the stem itself.

The construction will be understood by reference to the annexed drawings, which are made upon a scale three times the natural size to show the parts more clearly.

Figure 1 is a view of the complete syringe; Fig. 2, a longitudinal section of the complete stem and plunger; Fig. 3, a plan of the cap with stem in section. Fig. 4 is an elevation of the adjusting-rod; Fig. 5, a plan, and Fig. 6 a section, of the threaded hub attached to the rod. Fig. 7 is a plan, and Fig. 8 an elevation, of the conical collar. Figs. 9 and 10 are a plan and elevation of the middle collar of the plunger. Fig. 11 is a plan of the stem with the lock-nut thereon.

$a$ is the casing of the syringe; $b$, the cap of the same with square hole $c$, in which the square stem $d$ is fitted and provided with central bore to receive the adjusting-rod $e$.

$f$ is the fluid-tube, and $g$ the nozzle from which the fluid is discharged.

The plunger is shown provided with two cup-leather packings $h$, only one of which is in practice expanded, as that suffices to pack the piston effectively. The cup-leathers are clamped upon opposite sides of a collar $i$ by washers $j$ and nut $k$, applied to the lower end of the rod $e$. A threaded hub $m$ is secured to the rod inside the upper cup-leather $h$, and a conical packing-collar $n$ is provided with threaded hole $n'$ in the center to fit such hub. The conical end of the collar is fitted within the cup-leather, and it is obvious that the rotation of the collar upon the hub operates to move it longitudinally, and thus affords the means of expanding the packing when required. The rod $e$ is shouldered at opposite ends, so as to turn or swivel within the stem $d$, the hub $m$ touching the lower end of the stem, and a button or knob $p$ being secured upon the rod in contact with the upper end of the stem to rotate the latter when the packing requires adjustment. Lugs $o$ are projected from the upper side of the collar $n$ to embrace opposite sides of the square stem $d$, and thus prevent the packing-collar from rotating. The rotation of the hub in one direction forces the conical collar downward within the cup-leather, and thus expands the same while the turning of the rod in the opposite direction moves the collar upward and loosens the packing. The entire plunger is fixed rigidly by the nut $k$ upon the rod $e$, and is thus turned therewith when the knob $p$ is rotated, the packing-collar $n$ being then held from rotation by the stem $d$, and consequently moving up or down upon the hub $m$, as desired. When the packing requires adjustment, the operator may actuate the collar $n$ by merely holding the syringe in the hand and turning the knob $p$ in the desired direction, the fitting of the square stem to the square hole $c$ in the cap of the syringe holding the stem and the collar $n$ from rotation automatically without any attention upon the part of the operator. By forming shoulders upon the rod $e$ at opposite ends of the stem, the rod is kept in the same relation to the stem at all times and does not move in or out of the same; but the knob $p$ remains in snug contact with the top of the stem. Such construction is not only more neat, but it causes the plunger to rotate with the rod when the latter is turned without any longitudinal movement, and thus prevents the displacement of any fluid in the cylinder, which would result if any longitudinal movement of the piston were caused in an adjustment of the packing. A stop-nut $s$ is applied to the stem, as is usual, to limit the movement of the plunger when required, and such nut is fitted to a screw-thread cut upon the corners of the stem, and may thus be adjusted as readily as if the stem were round, while the flattened sides of the stem furnish convenient places for the application of the scale-figures. (Shown in Fig. 1.) By making the stem square it is not only held from rotation; but its flat sides afford a larger space for the application of the figures to the scale.

Having thus set forth the nature of my invention, what I claim is—

1. In a syringe, the combination, with a casing and a cap having a square hole, of a plunger attached to a square stem and having a packing and a collar for expanding the same, means to hold the collar from turning in relation to the stem, a rod fitted to turn within the stem, and a screw-thread connecting the rod and collar, as and for the purpose set forth.

2. In a syringe, the combination, with a casing and a cap having a square hole, of the square stem fitted to such hole, the rod $e$, fitted to turn within the stem, the cup-leathers $h$, clamped upon the rod by washers $j$, the threaded hub $m$ upon the rod, and the conical collar $n$, fitted to the thread upon the hub and provided with the lugs $o$, embracing the stem, as and for the purpose set forth.

In testimony whereof I have hereunto set my hand in the presence of two subscribing witnesses.

THEODORE B. WILCOX.

Witnesses:
EDWARD F. KINSEY,
HENRY J. MILLER.